United States Patent Office 3,108,099
Patented Oct. 22, 1963

3,108,099
TERTIARY AMINO-METHYL AMIDES OF PYRAZINE-CARBOXYLIC ACID
Ernst Felder and Ugo Tiepolo, Milan, Italy, assignors to Bracco Industria Chimica S.p.A., Milan, Italy
No Drawing. Filed June 30, 1960, Ser. No. 39,763
Claims priority, application Switzerland July 31, 1959
8 Claims. (Cl. 260—247.2)

The present invention relates to a group of new chemotherapeutically active derivatives of pyrazine-carboxylic acid amide. The invention also provides a process for the production of these new compounds.

The present invention is more especially concerned with the new aminomethylamides of pyrazine-carboxylic acid, which have the following general formula

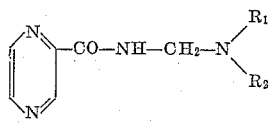

in which formula

represents a lower dialkylamino group or a heterocyclic radical of the general formula

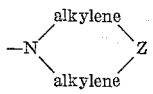

wherein "alkylene" is a lower alkylene radical with from 1 to 3 carbon atoms, preferably 1 to 2 carbon atoms, and Z represents a —CH$_2$— group or a second hetero group, namely —O—, —S— or —NR$_3$—, R$_3$ representing a lower alkyl group.

The invention also includes the acid addition salts of the above free bases with pharmacologically acceptable inorganic and organic acids, such as for example hydrochloric acid, sulfuric acid, tartaric acid, citric acid.

It has surprisingly been found that the substances of the above general formula show unusually strong and far-reaching antibacterial activities. They are, for example superior in their activity to the basic substance pyrazine-carboxylic acid amide on average by more than about ten times. This extraordinary difference can be attributed to a different type of operating mechanism.

It has also been found that the compounds according to the invention are also active against micro-organisms which are resistant to pyrazine-carboxylic acid amide. The toxicity of the compounds according to the invention is generally fairly low. At least some of the compounds which are most active chemotherapeutically are considerably less toxic than pyrazine-carboxylic acid amide itself.

The new compounds as well as their acid addition salts are moreover characterized by their surprisingly good solubility in water, which enables them to be used on a wider scale.

The compounds according to the invention are intended to be used as chemotherapeutical compounds for the treatment of infectious diseases, especially for the treatment of tuberculosis.

Especially valuable are the compounds in which

of the general formula given above is a heterocyclic radical.

The starting material for the production of the new compounds is pyrazine-carboxylic acid amide. This can be converted by reaction with formaldehyde and a secondary amine of the general formula

wherein

has the composition defined above, into the desired final product.

This conversion can be effected directly, by simultaneous action of formaldehyde and the desired secondary amine, but in certain cases also in stages, by converting pyrazine-carboxylic acid amide by reaction with formaldehyde or compounds engendering formaldehyde (trioxymethylene, paraformaldehyde etc.) and if necessary subsequent or simultaneous reaction with alcohols, thioalcohols or with diethylamine, firstly into N-methylol-pyrazine-carboxylic acid amide or an ether or thioether of N-methylol-pyrazine-carboxylic acid amide, or into N-diethyl-aminomethyl-pyrazine-carboxylic acid amide, this intermediate product being converted by further reaction with a secondary amine of the formula

into the desired final product having the general formula indicated above.

The preferred method of production of the new compounds is the following:

Pyrazine-carboxylic acid amide is refluxed with a mixture of formaldehyde and an excess of diethylamine, and the N-(diethylamino-methyl)-pyrazine-carboxylic acid amide thus formed is isolated by evaporation and subsequent crystallization. This intermediate product is heated without application of a particular solvent with an excess over the molar ratio of a secondary amine of the general formula

whereby diethylamine is liberated and the desired aminomethyl-pyrazine-carboxylic acid amide derivative is formed and then isolated by evaporation and subsequent crystallization.

The invention is further illustrated by the following examples:

EXAMPLE 1

*N-(Diethylamino-Methyl)-Pyrazine-Carboxylic Acid Amide*

98.5 parts by weight of pyrazine-carboxylic acid amide and 260 parts by volume of diethylamine are mixed in a flask equipped with a reflux condenser and a stirrer device. 91 parts by weight of aqueous formalin (37%) are run into the mixture over a period of 30 minutes while stirring. An exothermic reaction is started, and the temperature increases spontaneously to about 50° C.

The reaction mixture is boiled for about 5 hours at about 60° C. under reflux on a water bath. The reaction mixture is thereupon completely evaporated in vacuo at a bath temperature not higher than 40° C. up to a maximum of 50° C. The evaporation residue is taken up in aobut 200 parts by volume of ligroin at a temperature of 60° C. The solution is, if required, dried and filtered while warm to separate out any pyrazine-carboxylic acid amide which have not reacted. The temperature is then lowered to about —10° C., to precipitate the desired product. This is separated and if necessary again recrystallized, this time from low-boiling petroleum ether. The N - (diethylamino-methyl)-pyrazine-carboxylic acid amide is obtained with a yield of about 90%; it melts at 47 to 50° C. The product is very readily soluble in water and in most organic solvents, such as for example alcohols, ketones and esters. The aqueous solution is not permanently stable.

*Microanalysis.*—Calculated for $C_{10}H_{16}ON_4$ (molecular weight 108.26): C calculated 57.67%, H calculated 7.74%, N calculated 26.90%. C found 57.65%, H found 7.83%, N found 27.14%.

EXAMPLE 2

N - (diethylamino-methyl) - pyrazine-carboxylic acid amide can also be obtained by boiling together 50 parts by weight of N-methylol-pyrazine-carboxylic acid amide (prepared from pyrazine-carboxylic acid amide by heating with aqueous formalin), 25 parts by volume of water and 150 parts by volume of diethylamine being boiled for 20 hours under reflux. Working up is effected in the same way as described in Example 1, that is to say, the reaction solution is evaporated and the residue is recrystallized from ligroin and petroleum ether. Yield 70 to 80% of the theoretical.

EXAMPLE 3

N-(Morpholino-4'-Methyl)-Pyrazine-Carboxylic Acid Amide 500 parts by weight of N-(diethylaminomethyl)-pyrazine-carboxylic acid amide and 2,500 parts by volume of morpholine (excess) are mixed in a flask equipped with a stirrer device and distillation device. The flask is heated whilst stirring so that a slow distillation occurs (bath temperature about 140 to 150° C.). The distillation temperature rises gradually from 60 to 100° C. and finally to 127° C. (the boiling point of the morpholine). The distillation material consists of a large quantity of diethylamine and of morpholine. In this way, the N-(diethylamino-methyl)-pyrazine-caboxylic acid amide is reacted with exchange of the amino group to the N-(morpholino-methyl) - pyrazine-carboxylic acid amide. After 30 minutes to 1 hour, the temperature is lowered to 50° C. and the reaction mixture is concentrated by evaporation in vacuo. The evaporation residue, consisting of N-(morpholino-methyl)-pyrazine-carboxylic acid amide is recrystallized from about 400 parts by volume of hot benzene. Yield: 92% of the theoretical. Melting point 114 to 117° C. titre 98 to 98.5%. In order to obtain a comparatively pure product, it is possible to recrystallize again from a small quantity of morpholine. It is necessary to ensure that the heating is not too prolonged and that the temperature does not exceed 50 to 60° C. The product separated out by crystallization is suction-filtered at ice temperature and washed with a small quantity of cold ether. Melting point: 118.5 to 120°.

*Microanalysis.*—Calculated for $C_{10}H_{14}O_2N_4$ (molecular weight 222.24): C calculated 54.04%, H calculated 6.35%, N calculated 25.21%. C found 53.9%, H found 6.29%, N found 25.12%.

The process of production can also be slightly modified by cooling to 0° C. after distilling off the diethylamine and some of the morpholine and by the precipitating product being separated by filtration or centrifuging.

In this way, a purer product is obtained, but nevertheless with a somewhat smaller yield.

N-(morpholino-4'-methyl)-pyrazine amide is very readily soluble in water. The aqueous solution cannot be kept for an unlimited period. After a certain time, small traces of free formaldehyde can be detected.

The solutions of the acid addition salts of the above compound are more stable than the solutions of the free base.

The hydrochloride addition salts of N-(morpholino-methyl)-pyrazine-carboxylic acid amide is obtained by adding a solution of HCl gas in ethanol being added to an alcoholic solution of the base. The hydrochloride crystallizes out as a colorless salt mass, is filtered with suction, washed with a little alcohol and dried in a desiccator. The hydrochloride thus obtained is very readily soluble in water (~70% at 20° C.), less soluble in ethanol and insoluble in non-polar solvents such as benzene, diethyl-ether, acetone etc. Melting point 195° C. with carbonization.

A 10% aqueous solution of the salt has a pH value of about 3.5.

The acid tartrate of N-(morpholino-methyl)-pyrazine-carboxylic acid amide is obtained by a solution of tartaric acid (7.5 g. plus 0.5 g. excess) in 40 cc. of ethanol) being added at about 60° C. to an alcoholic solution of the free base (11.1 g. of base in 50 cc. of ethanol). After cooling, the acid tartrate which has crystallized out is filtered with suction and dried. Yield 17.2 g.; 95% of the theoretical.

Content (determined by titration with 0.1 N-NaOH): >99%. Melting point: 142° C. with carbonization.

The tartrate obtained in this way is very readily soluble in water (about 50% at room temperature), but is practically insoluble in non-polar solvents. The aqueous solution has a pH value of about 4.0.

EXAMPLE 4

N-(Pyrrolidino-1'-Methyl)-Pyrazine-Carboxylic Acid Amide 10 parts by weight of N-(diethylamino-methyl)-pyrazine-carboxylic acid amide are mixed with 40 parts by volume of pyrrolidine. The mixture is boiled under reflux for 2 hours, the conversion (exchange of the amines) being completed. The reaction mixture is now evaporated to dryness in vacuo at lowest possible temperature. 200 parts by volume of ligroin (boiling point 80 to 120° C.) are added to the solid residue, the mixture is heated to boiling point whilst stirring, the hot solution is filtered until clear and cooled to ice temperature, the desired product crystallizing out. This is separated and repeatedly recrystallized from ligroin. Melting point: 99 to 102° C.

*Microanalysis.*—Calculated for $C_{10}H_{14}ON_4$ (molecular weight 206.24): C calculated 58.23%, H calculated 6.84%, N calculated 27.17%. C found 58.01%, H found 6.84%, N found 27.17%.

N-(pyrrolidino-methyl)-pyrazine-carboxylic acid amide is very readily soluble in water. The aqueous solution of the free base has a very strong alkali reaction (pH 11); it can therefore be satisfactorily titrated with dilute hydrochloric acid.

EXAMPLE 5

N-(Piperidino-1'-Methyl)-Pyrazine-Carboxylic Acid Amide 10 parts by weight of N-(dimethylamino-methyl)-pyrazine-carboxylic acid amide are mixed with 50 parts by volume of piperidine and so heated in a flask that slow distillation (5 to 10 parts by volume per 30 minutes) takes place. Initially, the temperature is kept as low as possible, so that predominantly only the diethylamine formed by the reaction distills off. Towards the end of the conversion, the distillation temperature is raised, since the proportion of diethylamine decreases and that of piperidine is increased. Finally, the distillation temperature exceeds 100° C. (boiling point of piperidine 106° C.). The reaction solution is evaporated to dryness in vacuo at low temperature (40 to 50° C.).

The residue is taken up in about 50 parts by volume of warm diethylether, filtered while warm and finally cooled in an ice bath, the product crystallizes out. Yield: 60% of the theoretical.

After being recrystallized twice, the N-piperidinomethyl)-pyrazine-carboxylic acid amide melts at 112 to 114° C. It is readily soluble in water.

*Microanalysis.*—Calculated for $C_{11}H_{16}ON_4$ (molecular weight 220.27): C calculated 59.98%, H calculated 7.32%, N calculated 25.44%. C found 60.7%, H found 7.28%, N found 25.53%.

EXAMPLE 6

*N-(Di-N-Propyl-Amino-Methyl)-Pyrazine-Carboxylic Acid Amide*

10 parts by weight of N-(diethylaminomethyl)-pyrazine-carboxylic acid amide and 40 parts by volume of di-n-propyl-amine are mixed and heated to such a temperature that slow distillation just occurs (5 to 10 cc. of distillate per 45 minutes).

After 45 minutes, the reaction solution is evaporated to dryness in vacuo at 40 to 50° C. The residue is taken up in boiling diethylether and filtered while hot. The filtrate is evaporated to dryness and the residue is recrystallized from low-boiling petroleum ether.

In this way, there are obtained colorless crystal flakes which melt at 58 to 59° C. and which are readily soluble in water and polar organic solvents, such as for example alcohols, ketones, glacial acetic acid, etc.

*Microanalysis.*—Calculated for $C_{12}H_{20}ON_4$ (molecular weight 235.31): C calculated 60.99%, H calculated 8.53%, N calculated 23.71%. C found 60.70%, H found 8.58%, N found 23.85%.

EXAMPLE 7

*N-(4'-Methyl-Piperazino-1'-Methyl)-Pyrazine-Carboxylic Acid Amide*

Replacement of morpholine in Example 3 by the same quantity of N-methyl-piperazine provides in analogous manner the N-(4'-methyl-piperazino-1'-methyl)-pyrazine-carboxylic acid amide.

N - (4' - methyl - piperazino - 1' - methyl) - pyrazine-carboxylic acid amide is readily soluble in water and semi-polar solvents, such as low alcohols, ketones and chloroform, but is less soluble in benzene and diethylether and is sparingly soluble in benzine. Melting point 110–115° C.

As hereinbefore stated, the new aminomethylamides of pyrazine-carboxylic acid have proved to be highly effective, antibacterially acting compounds which are suitable for the treatment of infectious diseases, more especially tuberculosis.

The preferred compound is N-(morpholino-4'-methyl)-pyrazine-carboxylic acid amide.

This compound is on average and in vitro 10 times more effective than, but only half as toxic as, pyrazine amide.

It can be used as a free base, but preferably in the form of one of its salts with suitable inorganic or organic acids.

Experiments on human beings have shown that the compound, although it is several times more soluble in water than pyrazine-carboxylic acid amide, metabolises more slowly and is eliminated considerably more slowly than the latter compound. The good solubility is of importance for several uses, for example for the use thereof for pleural washes.

The solubility of N-(morpholino-4'-methyl)-pyrazine-carboxylic acid amide in water at 25° C. is 60%; the solubility of the corresponding hydrochloride addition salt is about 70%, whereas the solubility of the basic product, the pyrazine-carboxylic acid amide ($C_5H_5ON_3$), is only 1.5%.

Experiments on human beings have shown that the compound has good compatibility without toxic side effects and has an adequate chemotherapeutic action.

The preferred daily dose in the case of oral administration is between about 0.5 g. and about 5 g. A dosage unit is from about 50 milligrams to about 500–700 milligrams.

We claim:
1. An aminomethylamide of pyrazine-carboxylic acid of the formula

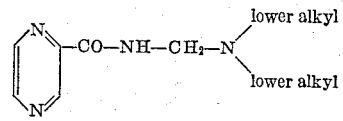

2. The N - (diethylamino-methyl)-pyrazine-carboxylic acid amide of the formula

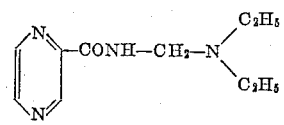

3. The N-(piperidinomethyl)-pyrazine-carboxylic acid amide of the formula

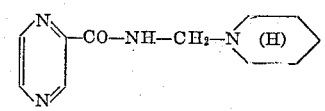

4. The N - (morpholinomethyl) - pyrazine-carboxylic acid amide of the formula

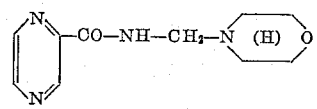

5. A N-(piperazino-methyl)-amide of pyrazine-carboxylic acid of the structural formula

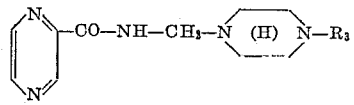

in which $R_3$ represents the lower alkyl group.

6. A heterocyclic aminomethylamide of pyrazine-carboxylic acid of the structural formula

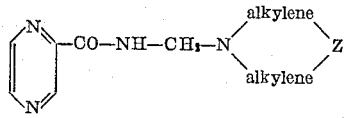

wherein the heterocyclic radical

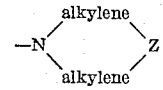

is a member of the group consisting of pyrrolidino, morpholino, piperidino, and 4-lower alkyl-piperazino.

7. The N - (pyrrolidino-methyl) - pyrazine-carboxylic acid amide of the formula

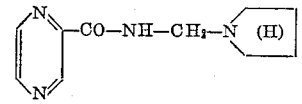

8. The N-(4'-methyl-piperazino-methyl)-pyrazine-carboxylic acid amide of the formula

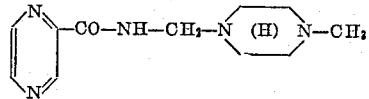

References Cited in the file of this patent

UNITED STATES PATENTS

| | | |
|---|---|---|
| 2,149,279 | Dalmer et al. | Mar. 7, 1939 |
| 2,528,928 | Weisblat et al. | Nov. 7, 1950 |
| 2,932,645 | Taylor et al. | Apr. 12, 1960 |